No. 705,987. Patented July 29, 1902.
G. E. WILSON.
THRESHING OR SEPARATING MACHINE.
(Application filed Sept. 13, 1899.)
(No Model.) 2 Sheets—Sheet 1.
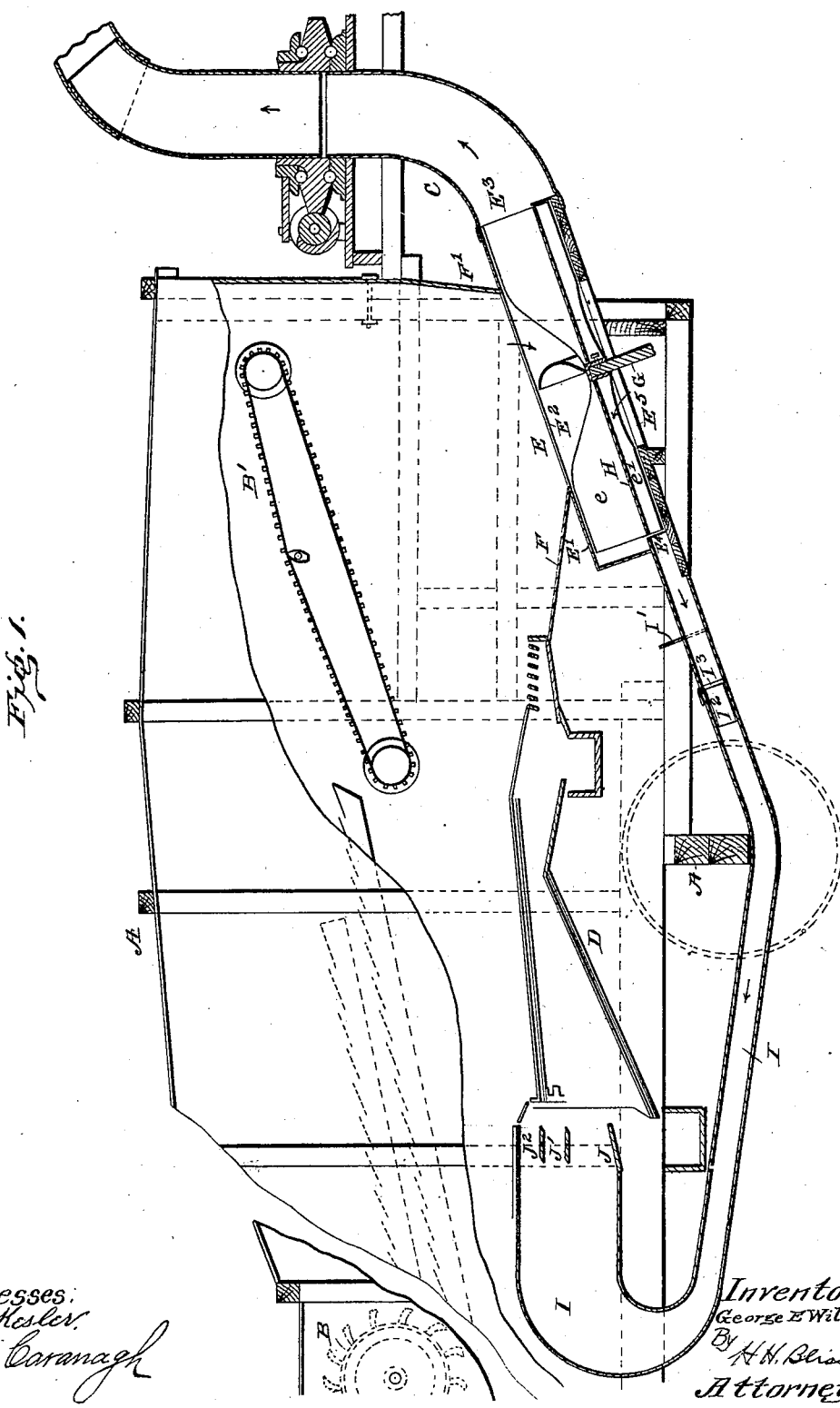
Witnesses:
C. D. Hesler.
R. B. Caranagh
Inventor:
George E. Wilson
By H. H. Bliss
Attorney No. 705,987. Patented July 29, 1902.
G. E. WILSON.
THRESHING OR SEPARATING MACHINE.
(Application filed Sept. 13, 1899.)
(No Model.) 2 Sheets—Sheet 2.
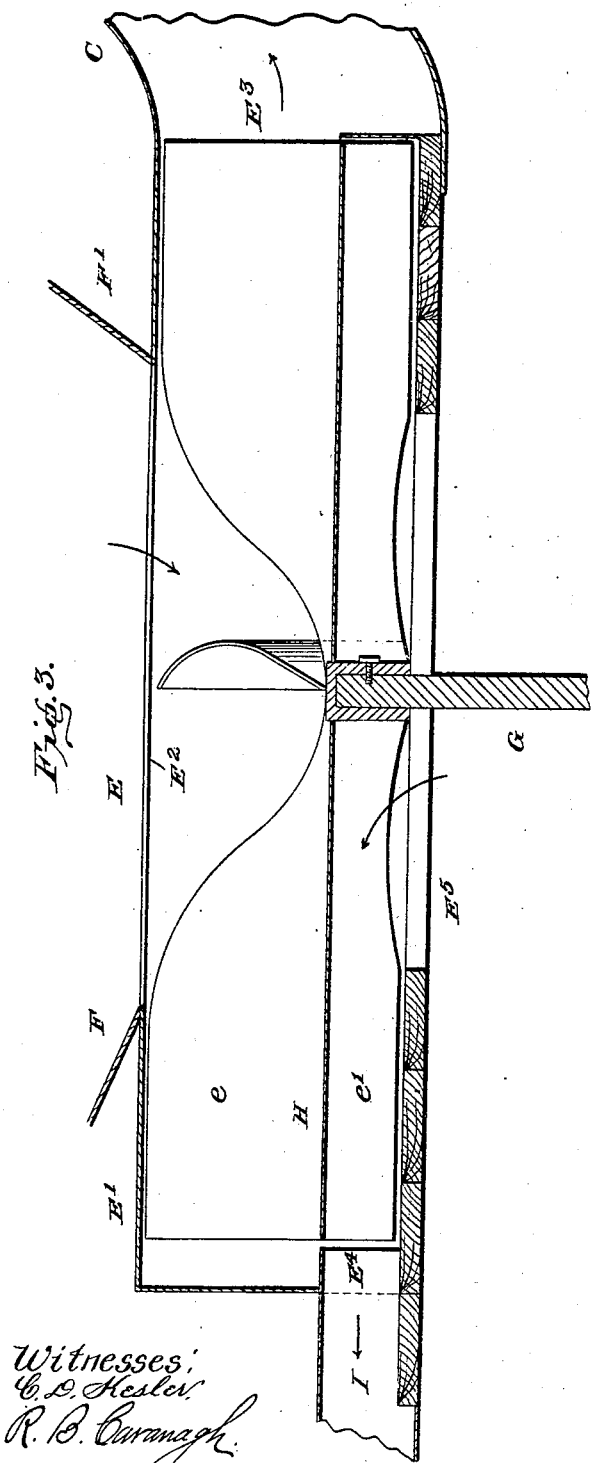
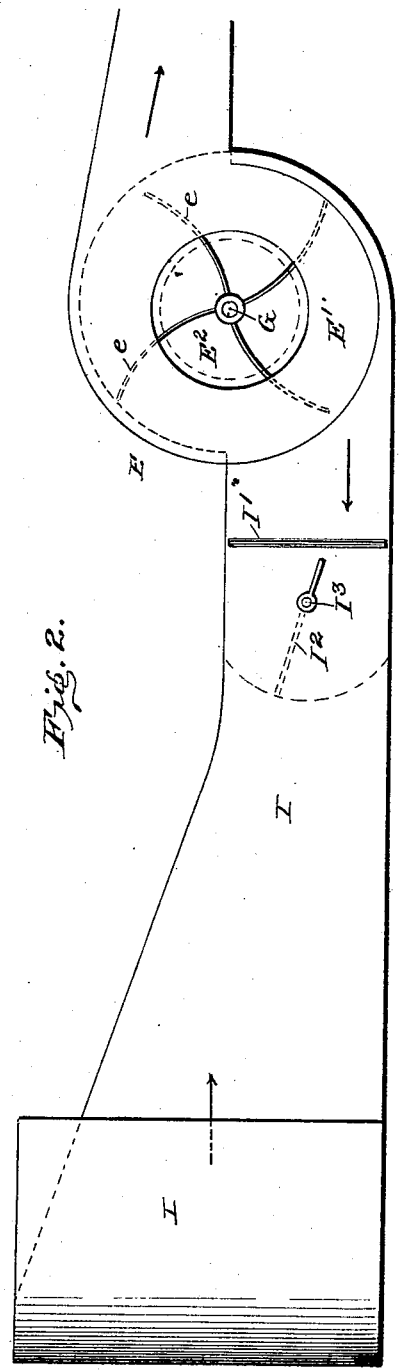
Witnesses:
Inventor:
George E. Wilson.
By H. H. Bliss
Attorney

UNITED STATES PATENT OFFICE.

GEORGE E. WILSON, OF STILLWATER, MINNESOTA.

THRESHING OR SEPARATING MACHINE.

SPECIFICATION forming part of Letters Patent No. 705,987, dated July 29, 1902.

Application filed September 13, 1899. Serial No. 730,369. (No model.)

*To all whom it may concern:*

Be it known that I, GEORGE E. WILSON, a citizen of the United States, residing at Stillwater, in the county of Washington and State of Minnesota, have invented certain new and useful Improvements in Threshing or Separating Machines, of which the following is a specification, reference being had therein to the accompanying drawings.

My invention relates mainly to threshing or separating machines in which pneumatic power is employed for the stacking or disposition of the straw, my object being to obtain from the pneumatic stacker-fan a positive and effective blast, which I employ for cleaning purposes in the machine. I am thereby enabled to dispense with the separate pneumatic mechanism usually employed in connection with the shoe to separate the chaff and materially simplify the construction of the machine while preserving its efficiency. Thus instead of constructing two separate pneumatic mechanisms and providing the necessary power devices to actuate them I can employ, in connection with the stacker-fan, a simple air pipe or conduit leading to the desired point relative to the shoe or separating devices. By my improvements I am enabled to control the separating-blast much more satisfactorily and avoid counter-currents and the constant adjustment of wind-blinds as ordinarily used. I also lessen the expenditure of power required for the stacking and separating operations.

In order to make the invention more clearly understood, I have shown in the accompanying drawings means for carrying the same into practical effect without limiting my improvements in their useful applications to the particular construction which for the sake of illustration I have delineated.

In said drawings, Figure 1 is a longitudinal sectional view of so much of a threshing or separating machine embodying my invention as is necessary for an understanding of the latter. Fig. 2 is a plan view of the fan, its casing, and the adjacent portions of the air-conduits. Fig. 3 is a vertical section of the fan on a larger scale.

Referring to the drawings, A indicates the frame of a threshing-machine; B, the cylinder; B', the straw-carrier or delivering means for the threshed straw; C, the stacker-conduit, and D the shoe, which parts may be of any suitable construction and are herein conventionally shown.

E is the pneumatic power device, consisting in the construction illustrated of fan-blades $e\ e'$, mounted on a shaft G in the frame A at any point suitable to receive the threshed straw from the carrier B' and deliver it to the stacker-conduit C. For this purpose the straw is received or guided by partitions F F' above the fan casing or housing E' and leading to an opening or eye $E^2$ of the latter.

The unitary character of the pneumatic power device having the two functions described may be realized in various ways.

Two separate fans or sets of fan-blades may be fixed on the shaft G, one for stacking the straw and the other for producing the separating-blast. For greater simplicity and efficiency, however, I prefer to employ, as illustrated, a single fan, the blade portions $e\ e'$ of which are integral or united, and in order to obtain therefrom separate blasts and prevent the straw from mingling with the separating-blast I provide a partition or diaphragm H in the casing E', preferably, though not necessarily, fixed to and movable with the fan shaft or blades, which divide the casing into two parts. When the blade portions $e\ e'$ are integral or united throughout their entire radial length, as shown, the partition H will be fixed to and turn with the blades, which eliminates the usual friction between the straw and the bottom of the fan-casing, the partition operating in such case as a support for the material operated upon by the fan. The partition H is so located between the two sides of the fan-casing as to give to the stacker-blast and to the separating-blast the desired proportionate amounts and powers. With one of the two sections or spaces thus produced in the casing E' the stacker-conduit C communicates by an opening $E^3$, through which the straw is forced by the blast from the blades $e$. With the other space, the intake opening for which is shown at $E^5$, communicates by an opening $E^4$ an air-conduit I, which leads by any convenient direction to the separating devices or shoe D, with relation to which latter the separating-blast may be delivered in the usual or any preferred manner. In an enlarged portion of the conduit I, near its delivery end, I provide adjustable blast-controlling devices J J' J².

It will be observed that one power device may be employed, connected with the shaft G, for driving both the stacking-blast and separating-blast producing mechanism, and for this purpose any usual and suitable power connections may be used, upon the particular character of which my present invention does not depend.

Certain of my improvements are independent of the use of a pneumatic stacker and relating to the mode of supplying the air-blast to the separating devices may be employed in machines that have mechanical stacking devices or independently of any stacker. The ordinary means for supplying an air-blast to the separating devices is a fan mounted forward of said devices with intakes at the side of the machine. The variableness of outside air-currents has led to the employment of wind-blinds to control the air admission to said intakes, respectively. Thus with a wind blowing against one side of the machine the intake on that side may be made of less area by the adjustment of its blinds; but even then the blast from the fan to the separating devices is not regular or direct, but will be more or less at an angle to the desirable direct forward lines. For the above and other reasons the use of the ordinary blast producing and delivery devices causes a complication of air-currents, accompanied by results that are often unsatisfactory in this and other operations of the machine. By my improvements, however, the operation of the fan for the separating-blast is unaffected by external air-currents, and I can supply a maximum of blast, the portion of which to be admitted to the separating devices is readily regulated and directed, resulting in an operation of the machine which is very regular and satisfactory, with little attention to and infrequent adjustment of the blast-controlling devices.

According to my improvements the fan or blast producing means for the separating devices is arranged at a distance from the latter and is provided with an air-conduit leading to the same, in which the air-blast assumes a regular and direct character before it is delivered to the separating devices; secondly, and irrespectively of the distance of the fan from the separating devices, I provide the fan with an intake at the bottom of the machine, whereby the blast will be unaffected by outside air-currents; thirdly, I provide for throttling the maximum blast in accordance with the demands of the separating devices, to which end the conduit I has a slide I' mounted to move vertically therein and by its adjustment to cut off more or less of the blast; fourthly and in order to compensate for any departure of the conduit or of its side walls from a direct line in leading to the separating devices or to neutralize any want of directness in the blast which may develop, I arrange a deflector I² in said conduit mounted to swing from the side of the same in its adjustment upon an approximately vertical axis I³.

What I claim is—

1. A stacker-fan having two compartments, an ejector-duct leading from one of said compartments, means for delivering material to be stacked to the ejecting compartment of the fan, and means for delivering a blast from the other compartment of the fan against said material before it enters the fan to force the same toward and into the fan.

2. A stacker-fan having two compartments, an ejector-duct leading from one of said compartments, means for delivering material to be stacked to the ejecting compartment of the fan, said fan being arranged in an approximate horizontal position, with one of said compartments above the other, and means for delivering a blast from the lower compartment of the fan against said material before it enters the fan to force the same into and toward the fan.

3. A stacker-fan having two compartments, an ejector-duct leading from one of said compartments, means for delivering the material to be stacked to the ejecting compartment, and means for delivering a blast from the other compartments of the fan against said material before it enters the material to force the same toward and into the fan, said fan having a moving straw-supporting partition between the material-receiving eye, and said other compartment.

4. In a threshing and stacking mechanism, the combination of a stacker-fan having means for producing a suction air-current and a separate positive blast, an ejector-duct, into which said suction-current is delivered, means for delivering the material to be stacked to the suction portion of the fan, and devices for directing the said positive blast from said fan into the suction portion of the fan.

5. In a combined threshing and straw-stacking mechanism, the combination of means for supplying threshed material, a straw-separating device, a fan having two compartments to one of which the separated straw is delivered, an ejector-duct leading from the straw-receiving compartment of the fan, air-blast-conducting passages leading from the other compartment of the fan and back to the eye of the straw-receiving compartment, and chaff-separating means located in said passages in the path of said blast.

6. In a combined threshing and straw-stacking mechanism, the combination of the following elements, namely: threshing devices, a straw-separating mechanism, grain and chaff separating means, a final ejecting-duct for chaff and straw, a fan-casing situated relatively between the final ejector-duct and the grain and chaff separating means, an inlet to the fan-casing for chaff and straw, a chamber communicating with said inlet and adapted to receive the chaff from the grain and chaff separating means and the straw and deliver both to said inlet, a rotary fan in said casing adapted to positively engage both the chaff and the straw and drive them through said ejector-duct and supply a blast of air to said duct and means for taking from said fan-casing a blast of air forward to the front side of the grain and chaff separating means to drive the chaff backward therefrom into the said chaff and straw chamber, substantially as set forth.

7. In a threshing-machine, the combination of the straw-separator, the grain and chaff separating means, the final straw-ejecting duct, a chamber or duct receiving the chaff immediately after it leaves the grain and chaff separating means, a fan situated relatively between the grain and chaff separating means and the final straw-ejector duct, a casing for the fan divided by a partition, a straw-conduit delivering straw from the straw-separator to one portion of the fan, the fan being adapted to positively engage with the straw as the latter passes through said casing and drive it through said final ejector-duct, and a duct leading from the other portion of the fan and extending relatively forward to the grain and chaff separating means and delivering thereto a positive blast of air adapted to carry the chaff therefrom to the said chaff chamber or duct, substantially as set forth.

8. In a threshing-machine, the combination of a threshing mechanism, a final straw-ejecting duct, a straw-separating mechanism receiving the straw from the thresher, a fan at the rear of the straw-separating mechanism arranged to receive and positively engage with the threshed straw and force the same through the ejector-duct, a grain and chaff separating means situated relatively forward of said fan, and an air-duct extending forward from said fan to the grain and chaff separating means whereby a positive blast of air is delivered to the grain and chaff separating means adapted to carry the chaff backward toward the straw-duct.

9. In a threshing-machine, the combination of a threshing-cylinder rotating on an axis relatively forward in the machine, a straw-separating mechanism at the rear of the threshing-cylinder, a fan at the rear of the straw-separator on an axis remote from that of the threshing-cylinder, a straw chamber or duct delivering the straw to said fan, the fan being adapted to positively engage with the straw and force it through the ejector-duct, a grain and chaff separating means relatively forward of said fan, an air-conduit leading from said fan to the forward part of the grain and chaff separating means and delivering a blast thereto in a rearward direction, and means for preventing the entrance of straw into the said air-conduit, substantially as set forth.

10. In a threshing-machine, the combination of a threshing mechanism, a straw-chamber, a final ejector-duct, a stacker-fan between the threshing mechanism and the ejector-duct, a casing for said fan having an upper compartment and a lower compartment cut off from the ejector-duct, the upper compartment having an upturned straw-receiving eye through which the straw enters to the fan and from which it passes to the ejector-duct, and the lower compartment having an independent air-receiving eye, a grain and chaff separating means, and an air-conduit leading from the lower fan-compartment to the grain and chaff separating means to deliver a positive air-blast thereto, substantially as set forth.

11. In a threshing-machine, the combination of the straw-separator, the grain and chaff separating means, a fan-casing having an upwardly-turned eye and divided into two compartments, a chamber or duct which receives chaff from the grain and chaff separating means and straw from the separator, and guides both to the said eye, a final ejector-duct communicating with the upper compartment, a duct leading from the lower compartment to the grain and chaff separating means and a fan in said casing adapted to positively engage with the straw and chaff and eject them from said casing and also adapted to drive a positive blast of air through the grain and chaff separating means to carry the chaff to the ejecting-compartment, substantially as set forth.

12. The combination of the straw-separating mechanism, the grain and chaff separating means, the final straw-ejecting duct, the fan-casing having a straw-receiving eye in the path of the straw and an interior rotary partition below said straw-receiving eye dividing it into two compartments, fan-blades on both sides of the partition, one of said compartments communicating with the final straw-ejector duct, and an air-blast duct leading from the other of said compartments to the grain and chaff separating means, substantially as set forth.

13. In a threshing-machine, the combination of threshing devices, a straw-separating mechanism for separating the straw from the grain, grain and chaff separating means, a fan-casing having an eye adapted to receive the threshed straw, a straw ejecting or stacking duct, a fan in said casing, a diaphragm separating the casing into two parts, with one of which said straw-receiving eye communicates, and an air-supply eye for the other part of said fan, and a blast-duct leading from the latter part of said fan to said grain and chaff separating means, substantially as set forth.

14. In a threshing-machine, the combination of threshing devices, a straw-separating mechanism for taking the straw from the grain, grain and chaff separating means, a fan-casing having an upturned eye to receive the threshed straw, a straw ejecting or stacking duct, a fan in said casing having a diaphragm moving with the fan and separating the casing into two parts, with one of which parts said straw-receiving eye communicates, an air-supplying means for the under part of said fan, and a blast-duct leading from the latter part of said fan forward at the lower part of the machine to said grain and chaff separating means, substantially as set forth.

15. In a threshing-machine, the combination of threshing devices, a straw-separating mechanism for taking the straw from the grain, grain and chaff separating means, a fan-casing having an eye adapted to receive the threshed straw, a straw ejecting or stacking duct, a fan in said casing having a diaphragm moving with the fan and separating the casing into two parts, with one of which parts said straw-receiving eye communicates, an air-supply means for the other part of said fan and a blast-duct leading from the latter part of said fan to said grain and chaff separating means, the latter being arranged to deliver chaff to said straw-receiving eye, substantially as set forth.

In testimony whereof I affix my signature in presence of two witnesses.

GEORGE E. WILSON.

Witnesses:
A. J. HOLM,
S. BLAIR MCBEATH.